Jan. 25, 1966   W. L. BERNER ET AL   3,230,726
ELASTOMERIC CONNECTING MEANS FOR DOUBLE-WALLED CONTAINERS
Filed Jan. 27, 1964   4 Sheets-Sheet 1

INVENTORS
WILLIAM L. BERNER
DONALD E. BOBO

ATTORNEY

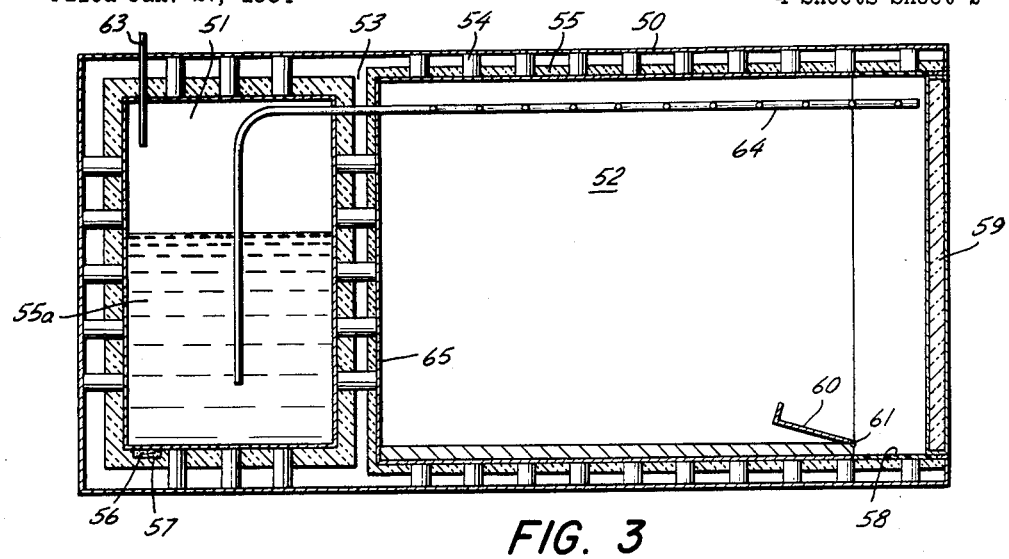
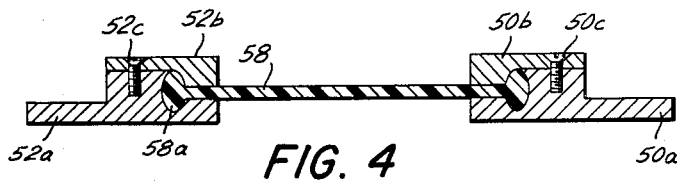
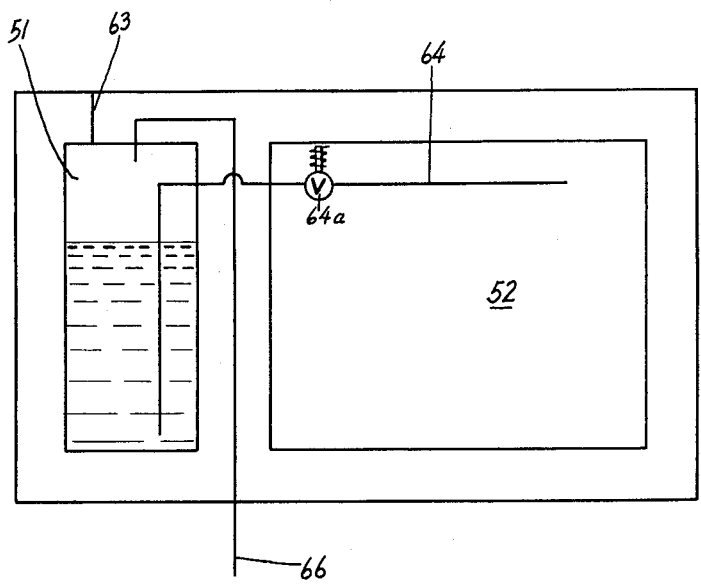

Jan. 25, 1966   W. L. BERNER ET AL   3,230,726
ELASTOMERIC CONNECTING MEANS FOR DOUBLE-WALLED CONTAINERS
Filed Jan. 27, 1964   4 Sheets-Sheet 3

INVENTORS
WILLIAM L. BERNER
DONALD E. BOBO
BY
ATTORNEY

INVENTORS
WILLIAM L. BERNER
DONALD E. BOBO
ATTORNEY

United States Patent Office 3,230,726
Patented Jan. 25, 1966

3,230,726
ELASTOMERIC CONNECTING MEANS FOR DOUBLE-WALLED CONTAINERS
William L. Berner and Donald E. Bobo, Indianapolis, Ind., assignors to Union Carbide Corporation, a corporation of New York
Filed Jan. 27, 1964, Ser. No. 340,314
12 Claims. (Cl. 62—45)

This invention relates to double-walled thermally insulated containers and in particular to double-walled containers having improved means for connecting the inner and outer walls.

Materials to be stored at low temperatures are often stored in double-walled containers having access conduits which are attached to both the outer walls and the inner walls and which traverse the space between the walls. Such access conduits are customarily composed of relatively inelastic materials (e.g. metals) which are subjected to stresses due to the relative movement of the outer and inner walls caused by thermal expansion and contraction of the walls. When the double-walls define an intervening evacuated insulation space, loss of vacuum in the space can occur if the relative movement of the walls causes even a minor crack in the access conduit or a minor detachment of the ends of the access conduit from the walls. In severe cases, complete failure of the access conduit can occur due to the relative movement of the walls of the container. The above-described difficulties associated with access conduits in double-walled containers are illustrative of the difficulties associated with any inelastic connecting means used to connect the inner walls and the outer walls of such containers.

It is an object of this invention to provide elastic connecting means for connecting the walls of double-walled thermally-insulated containers.

It is a further object of this invention to provide access means for double-walled thermally-insulated containers, which access means are resistant to failure due to relative movement of the container walls.

It is a still further object of this invention to provide panels suitable for use in fabricating double-walled containers having improved elastomeric connecting means for connecting the walls thereof.

Other objects and advantages of this invention will be apparent from the ensuing disclosure and the appended claims.

In the drawings:

FIGURE 3 is a longitudinal view, partly in section, or an insulated container of this invention wherein the outer wall encloses both a liquefied refrigerant gas compartment and a perishable food storage compartment.

FIGURE 4 is a sectional view of a fastening member employed in the embodiment of FIGURE 3 to fasten a perishable food storage compartment to the outer wall and to provide an access conduit.

FIGURE 5 is a schematic diagram of various conduits and related features that can be employed in a modification of the container of FIGURE 3.

Figure 1:
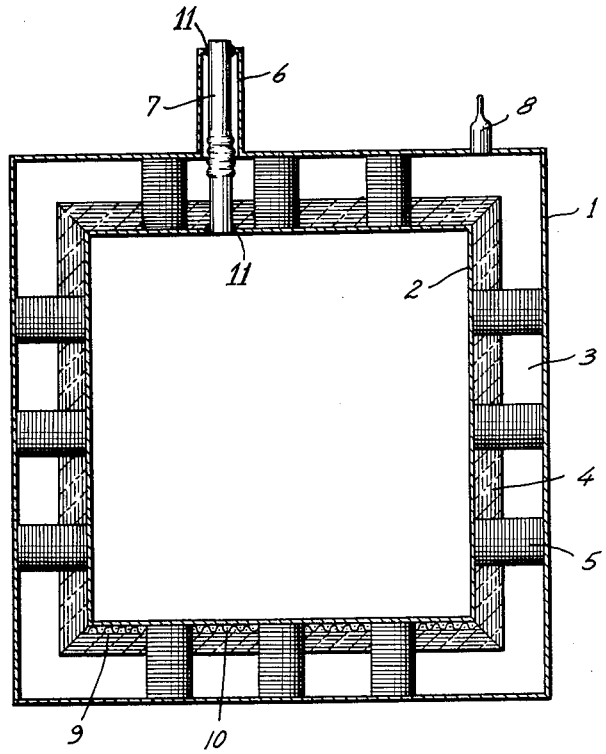
FIGURE 1 is a front elevation view in section of an insulated container of this invention.

This invention provides double-walled thermally-insulated containers wherein the walls are connected by connecting means composed of elastomeric materials having low thermal conductivity. In view of the materials employed in fabricating the connecting means, the danger that the relative movement of the walls of the containers of this invention due to thermal expansion and contraction might cause failure of the connecting means is greatly reduced or eliminated. In general, therefore, this invention provides a thermally insulated container comprising (1) an outer shell, (2) an inner storage chamber for storing materials, said shell and said chamber being (a) spaced from one another so as to define an intervening thermally insulating evacuable space therebetween, (b) subject to movement relative to each other due to thermal expansion and contraction when in use and (c) each provided with an opening, said openings being aligned to provide a passageway into the chamber, and (3) connecting means for sealing the evacuable space so as to maintain a vacuum in the evacuable space upon the evacuating of said space by minimizing entry of air into said space through said openings, said connecting means being composed of a gas-impermeable elastomeric material of low thermal conductivity that is gas-tightly attached to both the shell and the chamber and that is capable of deforming without failure so as to allow for the movement of the shell and chamber relative to each other due to thermal expansion and contraction. In one embodiment, the connecting means define an access conduit and such a container can be described as comprising (1) an outer shell, (2) an inner storage chamber for storing materials, said shell and said chamber being (a) spaced from one another so as to define an intervening thermally-insulated evacuable space therebetween, (b) subject to movement relative to each other due to thermal expansion and contraction when in use and (c) each provided with an opening, said openings being aligned to provide a passageway into the chamber, and (3) an access conduit lining the passageway for introducing materials to be stored into the chamber from without the container, said access conduit being composed of an elastomeric material of low thermal conductivity that is gas-tightly attached to both the shell and the chamber and that is capable of deforming without failure so as to allow for the movement of the shell and chamber relative to each other due to thermal expansion and contraction while sealing the evacuable space from entry of air through said openings.

The connecting means in the containers of this invention are composed of materials which are elastomeric, possessed of low thermal conductivity and gas impermeable. Obviously, the desired degree to which the material should possess these properties is a function of the specific container and the intended use. Generally, the elasticity of the materials used in the connecting means of this invention should preferably be such that a strip of the material having a length of 7.5 feet, a width of 6.5 inches and a thickness of 0.25 inch can adsorb a relative movement of the container walls (e.g. in a container as illustrated by FIGURE 3) of up to about 0.5 inch without failure. Generally, the thermal conductivity of the materials used in the connecting means of this invention should preferably be no greater than about 0.07 B.t.u. per hour, °F. square foot per foot. Generally, the gas impermeability of the connecting means of this invention should preferably be such that the amount of air passing through the material from the atmosphere into the evacuated space should be sufficiently small so that a pressure no greater than ten microns of mercury is built up in the evacuable space over a period of one year. Gas adsorbents can be used in the evacuable space to minimize pressure build-up where elastomers whose gas permeability would otherwise permit a greater pressure build-up are employed. In the latter case, sufficient adsorbent is used so that the pressure built up is no greater than ten microns of mercury over a one year period. Butyl rubbers are generally suitable for use as the connecting means. Butyl rubbers are composed predominantly or exclusively of polymerized isobutylene and may also contain a minor amount of butadiene or isoprene copolymerized with the isobutylene. Butyl rubbers are cured by known methods (e.g. by heat and sulfur or peroxide curing agents) and can contain various known additives (e.g. carbon black or silica fillers). One suitable butyl rubber is designated No. 93917 and is produced by the Firestone Tire and Rubber Company. This latter rubber has a SAE designation of R620ABCZ. It should be recognized that any rubber having the above-indicated properties can be used as the connecting means. Other suitable rubbers are rubbers produced from copolymers of from 33 to 39 wt. percent acrylonitrile and from 61 to 67 wt. percent butadiene; chlorosulfonated polyethylene rubbers (e.g. "Hyplon" sold by the E. I. du Pont de Nemours Co.); carboxylic rubbers (e.g. "Hycar 1072" sold by the B. F. Goodrich Co.); polysulfide rubbers (e.g. "Thiokol ST" sold by the Thiokol Chemical Co.); flourinated rubbers (e.g. "Vitron HV" sold by the E. I. du Pont de Nemours Co.); and rubbers produced from copolymerized ethylene and propylene.

This invention further provides panels that are suitable for use in producing the insulated containers of this invention. A panel of this invention comprises (1) an outer panel wall, (2) an inner panel wall spaced from the outer panel wall so as to define an intervening insulating space, and (3) at least one strip of a gas-impermeable elastomeric material of low thermal conductivity that is gas-tightly attached to an edge of the outer panel wall and to an adjacent edge of the inner panel wall and that is capable of deforming without failure so as to allow for movement of the walls relative to each other due to thermal expansion and contraction. Preferably, each pair of adjacent panel wall edges are connected by an elastomeric strip (i.e. preferably there are four strips in a panel having two adjacent rectangular panel walls disposed so that the edges are parallel), and the pressure built up will be due to atmospheric gases other than oxygen, nitrogen, water vapor and argon (the latter gases are readily adsorbed by cryogenic liquid cooled adsorbents).

The walls of the containers of this invention are subjected to various loads in use and such loads can be supported in any suitable manner. Thus, containers of this invention (and also the panels of this invention) can have, as an additional feature, the novel load supporting means of application Serial No. 340,311, filed January 27, 1964, in the names of W. L. Berner, C. P. Mulcahey and R. P. Skinner entitled "Load Support Means for Thermally Insulated Containers." The latter load supporting means consist essentially of glass fiber material. The longitudinal axes of the fibers in these load-supporting means are disposed perpendicular to the direction of heat leak through the evacuable space which, in the load-supporting pegs employed in the embodiment of the invention depicted in FIGURE 1, corresponds to their disposition perpendicular to the longitudinal axis of the pegs. This orientation of the fibers is important in minimizing heat leak through the load-support means by conduction through the fibers. It is highly desirable that the diameter of the fibers employed be in the range of from 0.1 micron to 100 microns with a fiber diameter from 0.20 micron to 12 microns being especially preferred. Preferably, the thickness of each sheet of fiber glass material should be from 0.002 to 0.25 inch for ease of fabrication. It should be recognized that the containers and panels of this invention are not limited to those having the above-described fibrous glass support means. Any suitable support means can be used.

Referring now more specifically to the drawings, FIGURE 1 is an insulated container of the present invention having an outer wall or shell 1 and an inner wall or storage compartment 2 enclosed by and spaced from the outer shell 1 so as to define an intervening evacuable space 3 in which is provided a compression-sensitive insulating material 4. Cylindrical load-supporting means or pegs 5 are disposed in an evacuable space and pass through the insulating material 4 which is provided with circular holes for this purpose. (Square pegs can also be used to advantage.) In the embodiment shown in FIGURE 1, the load-supporting pegs 5 are composed of a plurality of disc-shaped sheets of glass fiber material in superimposed relation with one another so as to define a solid cylindrical support means which is in load-transmitting contact with both the inner surface of outer shell 1 and the outer surface of compartment 2 so as to transmit the load on one surface to the other surface, thereby minimizing compression of insulating material 4 due to such loads. The longitudinal axes of the fibers in the sheets of glass fiber material which constitute load-supporting pegs 5 are disposed perpendicular to the longitudinal axis of the pegs and hence normal to the direction of heat leak into the container. The container is provided with cylindrical projection 6 of outer shell 1 within which is concentrically situated filling conduit or tube 7 composed of butyl rubber joined at one end to projection 6 and at the other end to inner storage compartment 2 in a gas-tight manner by epoxy adhesive 11 to prevent passage of air from the atmosphere into evacuable space 3. Filling tube 7 allows for the introduction of materials to be stored into the container (e.g. liquid nitrogen). When the container is employed to store materials at low temperatures, a conventional low heat conducting plug or other sealing means can be inserted in fill tube 7 in order to minimize heat leak into the container through filling tube 7. The container is provided with a vacuum seal-off fitting or pinch-off tube 8 which can be connected to an evacuating means for creating a vacuum in evacuable space 3 when desired. Screen 9 is attached to the outer surface of inner compartment 2 in such a manner as to provide a pocket for retaining a mass of a zeolitic molecular sieve gas adsorbent 10 in gaseous communication with the evacuable space 3 so as to help maintain the vacuum in evacuable space 3 after a subatmospheric pressure has been produced therein. In view of its elastomeric nature, tube 7 will deform rather than fail when shell 1 and compartment 2 undergo relative movement due to thermal expansion and contraction.

The novel load-support means that can be employed as an optional feature in the insulated containers of this invention can be provided in any suitable configuration. By way of illustration, the load-support means can be in the form of solid cylindrical pegs as depicted in FIGURE 1. (Alternately, square pegs produced from thin squares of fibers can be produced and used to advantage in the same way as cylindrical pegs.) In such cylindrical pegs the discs of fibrous glass material can be stabilized in a desired configuration during fabrication of a container and during use therein by any appropriate means such as by stacking the discs in a fabric (e.g. nylon or cotton) cylinder or sock. The fabric socks also restrain the fibers from squeezing outward under load and thereby failing. Stabilization can also be achieved by gluing the discs together with a minor amount of a suitable adhesive. Suitable adhesives include epoxy resins, phenolic resins and the like. It is important that such adhesives are present in only a minor amount since major amounts of adhesives provide a continuous path for heat leak through the pegs. Accordingly, the pegs should contain no more than 40 weight-percent and preferably no more than 25 weight-percent of an adhesive. When a fabric cylinder or sock is used to stabilize the glass fibrous material, a rigid disc of plastic or other suitable material may be inserted at either end to provide flat surfaces to contact the outer shell and the inner compartment. Such cylinders or socks can also be used to precompress the discs. Suitable pegs can also be produced by compressing thick mats or bats of glass fibers in the presence of no more than 40 weight-percent (preferably no more than 25 weight-percent) of a suitable adhesive (e.g. an epoxy resin adhesive) and then curing the adhesive to bond the fibers together to produce a one-inch thick board. Thereupon, one-inch pegs can be cut or punched out of the board and as many of such pegs as are necessary can be glued together (e.g. with a rubber base cement) to produce a composite peg of the desired length.

Once positioned in an evacuated space in a container of this invention, the above-described pegs are stabilized against movement by the loads on the surfaces with which they are in contact, particularly by the atmospheric load on the walls of the container. The number and the dimensions of the pegs employed can be adapted to the particular container and so, for example, where the pegs are employed in the container having walls of either aluminum or stainless steel spaced from 0.25 to 2 inches apart and having wall thicknesses from 0.001 to 0.25 inch, the pegs preferably have a diameter from 0.25 to 3 inches with a spacing between the pegs of from 3 to 16 inches from center to center. Such pegs are preferably cylindrical although pegs of square or rectangular cross section can be employed. It is highly desirable that the pegs have a density from 20 lbs./cu. ft. to 80 lbs./cu. ft. inclusive when loaded in order to insure good performance in the containers of this invention. Pegs having greater densities have excessive thermal conductivities whereas pegs having lower densities have load carrying capacities which are too low. A peg density of about 40 lbs./cu. ft. is particularly desirable from the point of view of achieving both low thermal conductivity and excellent load carrying capacity. In fabricating a container of this invention it is often convenient to fasten the pegs to one wall by means of an adhesive for ease of maintaining the pegs in a desired position. Such solid pegs (e.g. cylindrical or square pegs) are generally the preferred load-supporting means of this invention in view of their high load carrying capacities, low heat leak and ease of fabrication.

Figure 6:
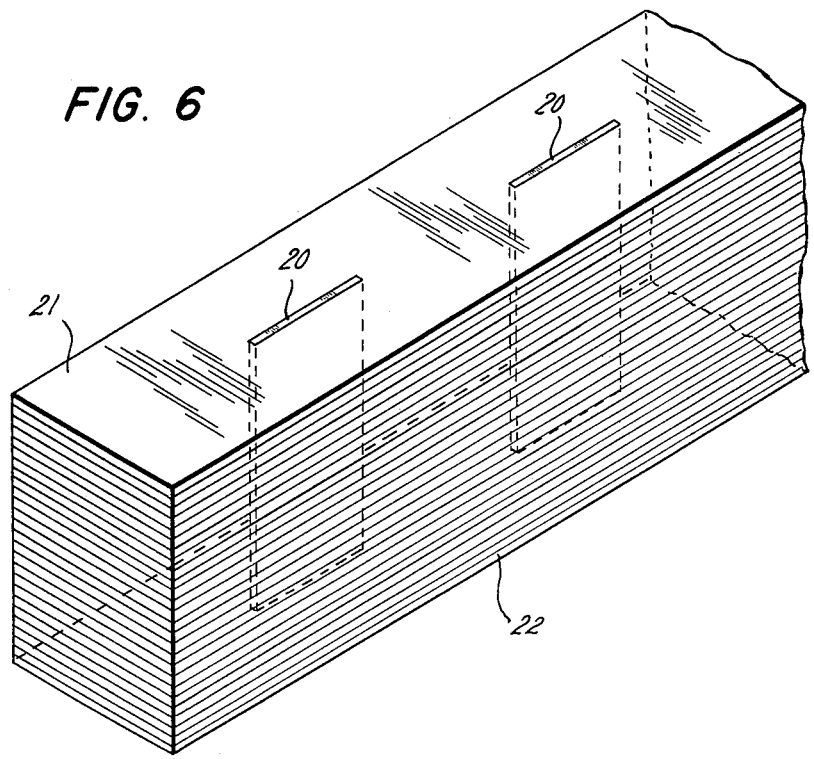
FIGURE 6 is an isometric view of one type bracing means or load support means suitable for use in bracing the walls of the containers of this invention.

Illustrative of another configuration of the load-support means that can be employed as an optional feature in the insulated containers of this invention is the strip or bar type configuration depicted in FIGURE 6. The load-support bar of FIGURE 6 consists essentially of rectangular sheets of fibrous material in superimposed relation with each other. The sheets in the bar can be precompressed and stabilized against relative movement during fabrication of the insulated container by tying or sewing the sheets together by any suitable means as, for example, by interlacing the sheets with thread or cord 20. Alternatively, the sheets of fibrous material in the bar-support means of FIGURE 6 can, as in the case of the above-described pegs, be stabilized during fabrication of the insulated container by employing a minor amount of adhesive between the sheets of fibrous material. When the bar depicted in FIGURE 6 is employed in an insulated container of this invention, it is disposed in the evacuable space of the container so that surface 21 is in contact with the inner or the outer wall and surface 22 is in contact with the other wall to insure that the fibers in the sheets of fibrous material are disposed perpendicular to the direction of heat leak into the container. The dimensions of such bar-support means can be adapted to the requirements of the insulated container in which they are employed and so, for example, in a double-walled container having aluminum or stainless steel walls spaced from 0.5 to 4 inches apart and having a wall thickness from 0.001 to 0.25 inch, the bars can be from 0.25 to 6 inches wide and can be spaced from 3 to 16 inches from center to center. When the insulating material employed is in the form of sheets, the insulation sheets can be sectioned to accommodate the bars. In this respect, the bar support means offer an advantage over the peg support means which must be positioned through a plurality of corresponding holes in such sheets.

Figure 7:
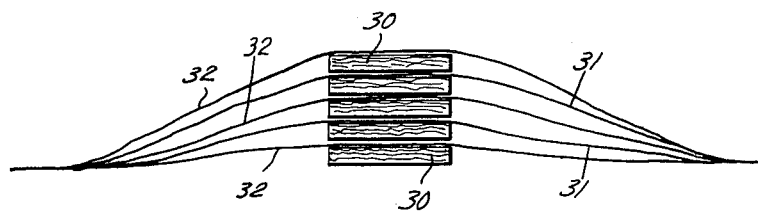
FIGURE 7 is a sectional view of another type bracing means suitable for use in bracing the walls of the containers of this invention.

Illustrative of yet another configuration of the novel load-support means that can be employed as an optional feature in the containers of this invention is the alternating load support-insulation layer configuration depicted in FIGURE 7. FIGURE 7 shows a configuration where narrow layers 30 composed of one or more narrow sheets of fiber glass material are disposed in alternating sequence between the layers of a composite insulating material which in turn is composed of alternating sheets of a metallic radiant heat reflecting component 31 and a glass fiber low heat conducting component 32. As is apparent, the thickness of the alternating load support-insulation layer configuration will be greater than the thickness of the adjacent portion of the insulation and hence the alternating load-support insulation layer configuration will support any load on the walls of the container and the adjacent insulation will not be subjected to such loads. This latter configuration can readily be achieved during the wrapping of the inner wall of the container with the composite insulating material by concurrently applying strips of fibrous load-supporting materials to the inner wall. Although the insulating properties of the insulating material sandwiched between the load-supporting material in this configuration is impaired somewhat by the compression to which it is subjected due to the loads on the container wall, only a relatively small amount of insulating material is so effected. The load supporting means of FIGURE 7 provides the additional advantage of not requiring pre-fabrication in any particular shape (e.g. as pegs or bars) and also serves to support the composite insulating material which need not be provided with holes or sectioned to accommodate this load-supporting means. Any desired sequence of layers of the various materials can be employed in the load-supporting means of FIGURE 7. In addition to the sequence shown, several successive layers, each composed of one or more sheets of the glass fiber material 30, can be interposed between each pair of layers 31 and 32 of the composite insulating material or one layer of glass fiber material 30 can be interposed between several pairs of layers 31 and 32 of the composite insulating material.

Various containers of this invention can be conveniently fabricated from panels of this invention composed of outer panel walls which, taken together, form all or a portion of the outer wall or outer shell of the container; inner panel walls which, taken together form all or a portion of inner storage compartment of the container, and elastomer strips attached to both the inner and outer walls which connect adjacent inner and outer wall edeges. Such panels can contain load-supporting means (such as described above) which traverse the space between the panel walls and are in load-supporting contact therewith. The space between panel walls can also contain a compression sensitive insulating material (such as described below) and, if desired, a gas adsorbent material in gaseous communication with the space. Thus, getter materials (e.g. palladium oxide or barium metal) can be present in this space for gas adsorption near ambient temperatures and crystalline zeolitic molecular sieves can be present for gas adsorption at low temperatures. Such panels are illustrated by FIGURE 2 described below in which elastomer strip 47 is attached to the panel walls by adhesive 48.

Figure 2:
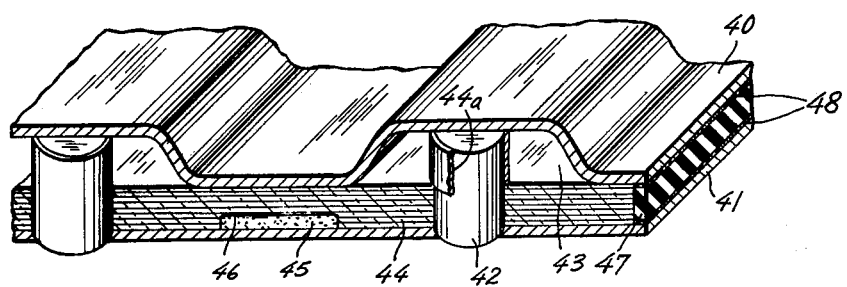
FIGURE 2 is an isometric view of a panel suitable for use in fabricating the insulated containers of the present invention.

FIGURE 2 depicts a panel of this invention suitable for use in fabricating the insulated containers of the present invention. The panels shown in FIGURE 2 are composed of outer panel wall 40 and inner panel wall 41 maintained in spaced relation with one another by a plurality of load-supporting pegs 42 so as to provide an intervening space 43. Located in intervening space 43 is compression-sensitive insulating material 44 provided with holes to accommodate pegs 42. Also located in intervening space 43 is a mass of a gas adsorbent 45 retained within a perforated metallic blister 46, which perforations provide gaseous communication between the adsorbent 45 and space 43. In the preferred panel depicted in FIGURE 2, outer panel wall 40 is corrugated and the load-support pegs 42 are arranged in parallel rows with one end of each peg in contact with the corrugated portion of outer panel wall 40. This arrangement of the corrugated outer panel wall 40 and load-supporting pegs 42 provides for a relatively long heat path through pegs 42 for a given overall wall thickness and provides for a rigid wall without resort to scantlings. Such scantlings are normally riveted to the wall and the rivets are a source of leakage. The lateral surface area of pegs 42 in the arc of the corrugations is covered with an insulating material 44a containing a radiant heat reflecting component so as to minimize the radiation of heat from the corrugated surface of outer panel wall 40 to the pegs 42. Load-supporting pegs 42 are conveniently covered with insulating materials 44a by wrapping sheets of such material about the longitudinal axis of the pegs 42. Although the illustrative panel depicted in FIGURE 2 is shown as having corrugated outer panel walls 40 and flat inner panel walls 41, it should be recognized that either or both walls of such panels can be corrugated or both walls can be flat as desired for a particular application. Alternatively the panel walls can be curved if desired. The particular dimensions of the corrugations and their spacings can be carried to suit the particular application in view. By way of illustration, when the insulated container is intended to be a commercial truck body having outer dimensions of 15 feet in length, 8 feet in height and 8 feet in width, the corrugated outer panel wall can be 2.5 inches in overall thickness having about 1.5 corrugations per foot, each corrugation being about 1.5 inches high, 4.7 inches wide across the inner surface and 3.25 inches wide across the outer surface. When the outer panel wall 40 is flat, the pegs are in direct contact with the outer panel wall. Where scantlings of conventional design welded to the inner surface of the outer panel wall are used, the pegs are located between the scantlings. Strip of butyl rubber 47 is bonded to an edge of wall 40 and to the adjacent, parallel edge of wall 41 by epoxy adhesive 48 so as to gas tightly seal this side of the panel. Preferably all four sides of the panel are sealed in this manner.

Compression-sensitive insulating materials that can be employed as an optional feature in the containers of this invention include composite insulating materials hereinafter more fully described. Such composite insulation comprises a radiant heat reflecting (i.e. radiation-impervious) component and a low heat conducting component located in the space between the outer shell and the inner compartment. This space is maintained at a pressure less than 1 micron (preferably at a pressure less than 0.1 micron) when the container is in use. These low operating pressures are attained initially by conventional means and are preferably maintained by the gas adsorbents described below. The components in the composite insulation used in this invention cooperate to minimize the total heat leak into the inner vessel by radiation and conduction. The thermal conductivity of this insulation is preferably no greater than about $3.2 \times 10^{-5}$ B.t.u. per hour, ° F., square foot per foot.

The components of the composite insulation that can be employed as an optional feature in the containers of this invention can be in the form of particles (i.e. powder) or in the form of sheets and the components can be composed of any of a wide variety of materials. By way of illustration, suitable radiant heat reflecting components include particulate metals, metal oxides or metal-coated materials (e.g. particulate copper paint pigments, aluminum paint pigments, magnesium oxide, zinc oxide, iron oxide, titanium dioxide, carbon black above 10 microns in size, copper-coated mica flakes and graphite) having particle sizes less than about 500 microns (preferably less than 50 microns). Suitable low heat conducting components include particulate silica, silicates (e.g. perlite), alumina, magnesia having particle sizes less than 420 microns (preferably less than 75 microns) and carbon black having particle sizes less than 0.1 micron. As further illustrated, suitable radiant heat reflecting components in sheet form include thin metal foil, such as aluminum, tin, silver, gold, copper and cadium foil preferably having a thickness between 0.2 millimeters and 0.002 millimeters. Suitable low heat conducting components in sheet form include plastic sheets (e.g. polyethylene terephthalate and polytetrafluoroethylene sheets) and fibrous sheets (e.g. glass fiber paper or web sheets), and are preferably composed of fibers having fiber glass diameters of less than 50 microns or more preferably of less than 10 microns. Insulation components in the form of sheets are disposed so that the sheets are substantially parallel to each other and substantially perpendicular to the direction of heat flow across the evacuable space between the outer shell and the inner compartment or vessel.

The radiant heat reflecting component and the low heat conducting component used in the composite insulation that can be employed as an optional feature in the insulated containers of this invention are so disposed in relation to each other that the latter component prevents transmission of heat across the evacuable space by conduction through the former component. By way of illustration, when both insulating components are in the form of sheets, they are arranged as alternating sequence. In the latter embodiment, the low heat conducting component sheets can serve as a spacing and supporting means for the radiant heat reflecting component sheets. As a further illustration, when both insulating components are in the form of particles (as in the insulation disclosed in U.S. Patent 2,967,152), the radiant heat reflecting component particles are dispersed in a matrix of the low heat conducting components particles. In the latter embodiment, the radiant heat reflecting component particles can constitute from 1% to 80% by weight of the total weight of both component particles.

Insulation materials suitable for use in the containers of this invention are disclosed in U.S. Patents 3,007,596; 3,018,016; 3,007,576; 3,009,600; and 3,009,601.

The containers of this invention preferably contain a gas adsorbent that is in vapor communication with the evacuable space between the outer shell and the inner compartment or vessel. The absorbent can be held in a perforated disc or blister or in a wire screen or glass cloth attached to the outer surface of the inner vessel. Such absorbents assist in maintaining a vacuum in the evacuable space. Particularly suitable gas absorbents which can be placed between the outer shell and the inner vessel in the insulation containers of this invention are crystalline zeolitic molecular sieves such as Zeolite A and Zeolite X.

The insulating containers of this invention can be provided in a variety of sizes and shapes and equipped internally and externally with a variety of ancillary equipment depending upon the particular use contemplated. Such uses include use as fixed insulated perishable food containers for the home, restaurants or warehouses. In the latter areas of use, the container can be fitted with shelves for holding the food and employed in combination with refrigerating means such as conventional mechanical refrigerating means. In addition, the insulated containers of this invention can be employed for storing and shipping liquefied refrigerant gases such as nitrogen in which case the containers can be equipped with filling conduits, filling control devices, pressure relief valves and the like. Moreover, containers of this invention can be employed in combination with refrigerating means arranged within or outside the containers suitably designed for shipping perishable materials, particularly perishable foods, by truck, rail or ship. An insulated container of the latter type is depicted in FIGURE 3 as described below.

FIGURE 3 depicts an insulated container of this invention having an outer shell 50 within which are located two separate compartments, liquefied gas storage compartment 51 and perishable food storage compartment 52. Outer shell 50 and compartments 51 and 52 can be composed of any suitable material such as stainless steel or aluminum. The outer surfaces of liquefied gas storage compartment 51 and perishable food storage compartment 52 together with the inner surface of outer shell 50 define an intervening evacuable space 53. Evacuable space 53 also extends between the adjacent walls of liquefied gas storage compartment 51 and perishable food storage compartment 52. A plurality of solid cylindrical load-supporting pegs 54 of the type described above are disposed in evacuable space 53 between the liquefied gas storage compartment 51 and the adjacent portion of the outer shell 50 so as to support the atmospheric load on the outer shell. Those pegs are disposed between the bottom surfaces of the compartments 51 and 52 and the outer shell 50 so as to also support the weight of compartments 51 and 52. Additionally, pegs 54 are disposed between liquefied gas storage compartment 51 and perishable food storage compartment 52 in order to maintain these compartuents at a distance from each other equal to the length of the pegs so as to stabilize the compartments against relative movement and prevent thermal contact between the walls of the compartments. Compression-sensitive insulating material 55 is disposed in the evacuable space 53 around compartments 51 and 52 so as to minimize the heat leak from outside the outer shell 50 into the compartments 51 and 52 and to minimize heat leak from perishable food storage compartment 52 to liquefied gas storage compartment 51. Inasmuch as the temperature difference between a liquefied gas storage compartment 51 and the surfaces surrounding it is much greater than the temperature difference between perishable food storage compartment 52 and the surfaces surrounding it, the thickness of the insulating material 55 around liquefied gas storage compartment 51 may be, as shown in FIGURE 5, greater than the thickness of insulating material 55 around perishable food storage compartment 52. Insulating material 55 is provided with holes through which pass pegs 54. A liquefied refrigerant gas 55a (such as liquid nitrogen) is provided in liquefied gas storage compartment 51 and this liquefied gas 55a is in thermal communication with a mass of a zeolitic molecular sieve gas adsorbent 56 which is retained in a perforated metal blister 57 depending from the bottom of liquefied gas storage compartment 51. The liquefied gas 55 cools the molecular sieve 56 thereby further improving the gas adsorbing properties of the sieve. The perforations in the blister 57 provide gaseous communication between the zeolitic molecular sieve gas adsorbent 56 and evacuable space 53 and serves to maintain a vacuum in the evacuable space after the evacuable space is evacuated. Strips of butyl rubber 58 join the top, bottom and side walls of perishable food storage compartment 52 to outer wall 50. These strips of butyl rubber 58 serve to prevent the passage of gas into evacuable space 53 and serve to prevent heat leak into perishable food storage compartment 52 while at the same time defining an access conduit for introducing food into perishable food storage compartment 52. Insulated storage compartment door 59 provides access to perishable food storage compartment 52. Door 59 can be insulated with polyurethane foam or other suitable insulating material. Alternately, the desired degree of insulation can be achieved by using a vacuum panel door. The floor of perishable food storage compartment 52 is provided with cover plate 60 rotatable about hinge 61 which can be positioned over the strip of butyl rubber 58 connecting the floor of compartment 52 to outer shell 50. Cover plate 60 prevents damage to the strip of butyl rubber 58 when perishable food is being introduced into perishable food storage compartment 52. In order to minimize heat leak into compartment 52 through cover plate 60, cover plate 60 is hinged so that it can be rotated into the position shown in FIGURE 3 when not needed to protect lower strip of butyl rubber 58. Low heat conducting filling tube 63 is provided for introducing liquefied gas 55a into liquefied gas storage compartment 51 and transfer conduit 64 is provided for transporting liquefied gas 55a from liquefied gas storage compartment 51 to perishable food storage compartment 52 in order to provide refrigeration for perishable food stored in perishable food storage compartment 52. Perforations are provided in the portion of the transfer conduit 64 located within perishable food storage compartment 52 to allow the liquefied gas 55 to be sprayed from the transfer conduit 64 as a fine mist on the perishable food within perishable food storage compartment 52. Suitable means are provided for regulating the flow of liquefied gas 55a into perishable food storage compartment 52 so as to maintain the perishable food at a predetermined desired temperature. The temperature in compartment 52 will be dependent on the type food being stored and will usually be between −40° F. and +60° F. Such flow regulating means includes the feature of discontinuing the transfer of the liquefied gas into perishable food storage compartment 52 when insulated storage compartment door 59 is opened. This latter feature prevents a waste of the liquefied gas when the insulated storage compartment door 59 is opened to introduce perishable food into perishable food storage compartment 52 or to withdraw the food.

The pressure required to transfer the liquefied gas 55a from liquefied gas storage compartment 51 through transfer conduit 54 in which perishable food storage compartment 52 can be created in any convenient manner. Thus, the pressure can be created by a heating coil in the bottom of liquefied storage compartment 51 which creates the desired pressure by vaporizing a portion of the liquefied gas 55a in response to a temperature sensing element in perishable food storage compartment 52. Preferably, the pressure is created initially by charging the liquefied gas to the liquefied gas storage compartment 51 along with vapor of the gas at a pressure sufficient to insure the transfer of the gas during the desired period of operation. Preferably, a pressure from 5 p.s.i.g. to 25 p.s.i.g. is maintained in compartment 51.

Liquefied gas storage compartment 51 is preferably provided with internal bracing means or supports to assist in carrying loads imposed on compartments 51.

The expansion and contraction of the outer shell 50 and the perishable food storage compartment 52 of the insulated container of FIGURE 3 is provided for by employing an elastomeric organic polymer material (e.g. butyl rubber) as strip 58. Additional provision can be made for the expansion and contraction of the outer shell 50 by employing corrugated walls as in FIGURE 2. The expansion and contraction of perishable food storage compartment 52 can be further provided for by constructing wall 65 of relatively thin and resilient material so that it will tend to buckle under stress.

Typical dimensions of a container in accordance with FIGURE 3 are an overall length of 20 feet (measured from left to right in FIGURE 3); overall height of 8 feet;

heights of compartments 51 and 52 of 7 feet; overall width of 8 feet; width of compartment 51 of 7.5 feet; width of compartment 52 of 7.5 feet; and strips 58 being 0.25 inch thick and 6.5 inches wide (measured from left to right in FIGURE 3).

The manner in which the strips of elastomeric organic polymer 58 are attached to the walls of perishable food storage compartment 52 and outer shell 50 is illustrated by FIGURE 4. In FIGURE 4, the strip of elastomeric organic polymer 58 is provided with enlarged end portions 58a which are adapted to fit into bracket 52a attached to the floor of inner compartment 52 and into bracket 50a attached to outer shell 50. Enlarged end portions 58a of elastomer strip 58 are maintained in brackets 52a and 50a by plates 52b and 50b held in place by means of screws 52c and 50c. Adhesives (e.g. nylon-filled epoxy adhesives such as "Narmco 7343") can be employed to insure secure attachment of strip 58.

FIGURE 5 illustrates a flow diagram of a system for transferring a cryogenic liquid from storage compartment 51 of FIGURE 3 to storage compartment 52 of FIGURE 3 in order to refrigerate the contents of compartment 52. Compartment 51 is filled with a cryogenic liquid through conduit 63 and then the interior of compartment 51 is pressurized by conventional means to a pressure of about 5 p.s.i.g. to 25 p.s.i.g. Conduit 66 is provided with a relief valve and safetry valve (not shown). Conduit 64 is provided with a solenoid valve 64a which is connected to a suitable temperature controller (not shown). When the temperature in compartment 52 arises above a predetermined point, the controller energizes a solenoid 64a to open it. The cryogenic liquid then flows from compartment 51 into compartment 52 through conduit 64 because of the pressure differential (compartment 52 is at about atmospheric pressure). The cryogenic liquid is sprayed into compartment 52 through perforations in conduit 64 until the temperature in compartment 52 decreases to the predetermined point. At the latter point, solenoid valve 64a closes, terminating the flow of the cryogenic liquid.

Figure 8:
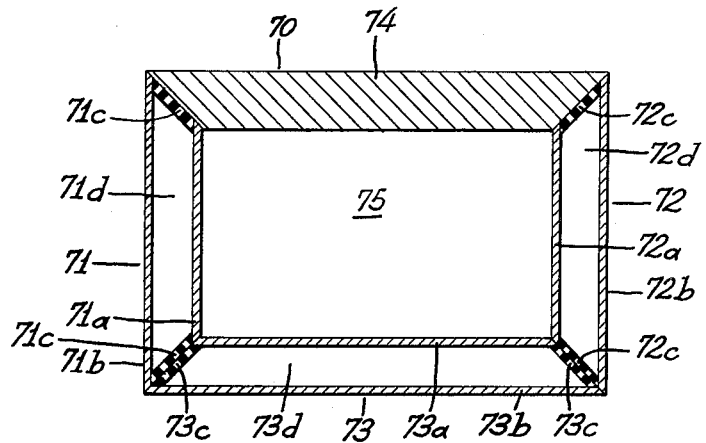
FIGURE 8 is a sectional view of a container of this invention fabricated from panels of this invention wherein the connecting means define an access conduit (front elevation view).

FIGURE 8 depicts a container of this invention 70 produced from panels of this invention 71, 72 and 73. In FIGURE 8 container 70 is composed of side panels 71 and 72, floor panel 73 and removable cover 74. Stainless steel inner panel walls 71a, 72a and 73a define internal storage space 75. Inner panel walls 71a, 72a and 73a are spaced from stainless steel outer panel walls 71b, 72b and 73b so as to define separate intervening evacuable insulating spaces 71d, 72d and 73d. Panels 71, 72 and 73 can be provided with conventional pinch-off tubes for evacuating spaces 71d, 72d and 73d. Insulating spaces 71d, 72d and 73d contain load support means, such as the preferred glass fiber load support means described hereinabove (particularly the load support pegs depicted in FIGURE 1) (not shown), gas adsorbents as described above; (not shown) and compression sensitive insulating materials as described above (not shown). Inner panel wall 71a is joined to outer panel wall 71b by elastomeric strips 71c; inner panel wall 72 is joined to outer panel wall 72b by elastomeric strips 72c; and inner panel wall 73a is joined to outer panel wall 73b by elastomeric strips 73c. Strips 71c, 72c and 73c are composed of gas-impermeable and low thermal conducting butyl rubber bonded to the panel walls with an epoxy adhesive. Strips 71c, 72c and 73c allow for the relative movement of the outer and inner panel walls without failure and serve to maintain a vacuum in spaces 71d, 72d and 73d after evacuation thereof. Upper strips 71c and 72c define an access conduit for introducing materials into space 75 and for withdrawing materials therefrom. Cover 74 can be of conventional design. The adjacent edges of inner panel walls 71a, 72a and 73a are welded together to form an inner shell and the adjacent edges of outer panel walls 71b, 72b and 73b are welded together to form an outer shell. The inner and outer shells can be suitably braced (e.g. with angle irons). Container 70 also has vertical front and rear panels (not shown) constructed in the same manner as are panels 71 and 72.

Figure 9:
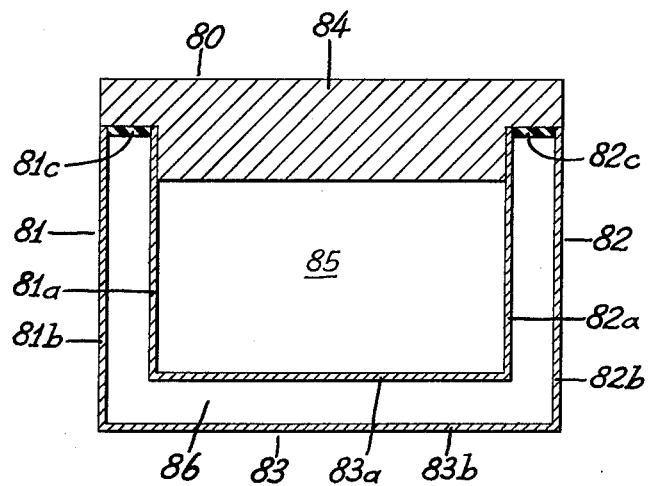
FIGURE 9 is a front elevation sectional view of another container of this invention fabricated from panels of this invention.

FIGURE 9 depicts a container of this invention 80 produced from panels of this invention 81 and 82. In FIGURE 9, container 80 is composed of side panels 81 and 82, floor panel 83 and removable cover 84. Stainless steel inner panel walls 81a, 82a and 83a define internal storage space 85. Inner panel walls 81a, 82a and 83a are spaced from stainless steel outer panel walls 81b, 82b and 83b so as to define a continuous intervening evacuable insulating space 86. One or more of the panels can be provided with conventional pinch-off tubes for evacuating evacuable space 86. Insulating space 86 contains load support means, such as the preferred glass fiber load support means described hereinabove (particularly the load support pegs depicted in FIGURE 1) (not shown); gas adsorbents as described above (not shown); and compression-sensitive insulating materials as described above (not shown). Inner panel wall 81a is joined to outer panel wall 81b by elastomeric strip 81c and inner panel wall 82a is joined to outer panel wall 82b by elastomeric strip 82c. Strips 81c and 82c are composed of gas-impermeable and low thermal conducting butyl rubber bonded to the panel walls with an epoxy adhesive. The adjacent edges of inner panel walls 81a, 83a and 82a are welded together to form an inner shell and the adjacent edges of outer panel walls 81b, 83b and 82b are welded together to form an outer shell. Strips 81c and 82c allow for the relative movement of the outer and inner shells without failure and serve to maintain a vacuum in space 86 after evacuation thereof. Cover 84 can be of conventional design. The inner and outer shells can be suitably braced (e.g. with angle irons). Container 80 also has vertical front and rear panels (not shown) constructed in the same manner as are panels 81 and 82.

It is apparent that the preferred glass fiber load supporting means that can be employed in the containers of this invention are particularly applicable to insulated containers having walls which, in the absence of the load supporting means, would tend to deform under loads (especially under atmospheric loads) so as to compress the insulating material. It is also apparent that such load supporting means are in contact with only a minor portion of the surfaces that define the evacuable space (e.g. from 1 to 5 percent of the area of each surface is in contact with the load support means). This limited contact between the walls and the support means minimizes heat leak. Despite this limited area of contact, adequate support for the walls is provided. It should be recognized that not every glass fiber in these support means also will necessarily have the above-described orientation perpendicular to the direction of heat leak. A minor amount of fibers not having this orientation can be tolerated, provided that the majority of the fibers have the desired orientation.

It should also be recognized that the improved connecting means of this invention can also be employed in containers for storing materials at temperatures higher than those of the surrounding atmosphere. Thus, containers having such connecting means and provided with internal heating means can be used in arctic climates to store materials at higher than ambient temperatures. Thus, these connecting means are generally useful in containers for storing materials at other than ambient temperatures.

As used herein, a cryogenic liquid denotes a liquid having a boiling point below −320° F. at atmospheric pressure. Such liquids include liquid nitrogen and liquid oxygen.

What is claimed is:

1. A thermally insulated container comprising (1) an outer shell, (2) an inner storage chamber for storing materials, said shell and said chamber being (a) spaced from one another so as to define an intervening thermally insulating evacuable space therebetween, (b) subject to movement relative to each other due to thermal expansion and contraction when in use and (c) each provided with an opening, said openings being aligned to provide a passageway into the chamber, and (3) gas-impermeable, elastomeric, low heat conducting connecting means for sealing the evacuable space so as to maintain a vacuum in the evacuable space upon the evacuating of said space by minimizing entry of air into said space through said openings, said connecting means being composed of a gas-impermeable elastomeric material of low thermal conductivity that is gas-tightly attached to both the shell and the chamber and that is capable of deforming without failure so as to allow for the movement of the shell and chamber relative to each other due to thermal expansion and contraction.

2. The container of claim 1 wherein the elastomeric material is butyl rubber.

3. A thermally insulated container comprising (1) an outer shell, (2) an inner storage chamber for storing materials, said shell and said chamber being (a) spaced from one another so as to define an intervening thermally insulating evacuable space therebetween, (b) subject to movement relative to each other due to thermal expansion and contraction when in use and (c) each provided with an opening, said openings being aligned to provide a passageway into the chamber, and (3) an access conduit lining the passageway for introducing materials to be stored into the chamber from without the container, said access conduit being composed of a gas-impermeable elastomeric material of low thermal conductivity that is gas-tightly attached to both the shell and the chamber near said openings and that is capable of deforming without failure so as to allow for the movement of the shell and chamber relative to each other due to thermal expansion and contraction while sealing the evacuable space from entry of air through said openings.

4. The insulated container of claim 3 wherein a getter material is provided in the evacuable space to maintain a vacuum in the space after it is evacuated.

5. The insulated container of claim 3 wherein palladium oxide is provided in the evacuable space to maintain a vacuum in the space after it is evacuated.

6. The insulated container of claim 3 wherein barium metal is provided in the evacuable space to maintain a vacuum in the space after it is evacuated.

7. The insulated container of claim 3 wherein a crystalline zeolitic molecular sieve gas adsorbent adapted for cooling with a cryogenic liquid is provided in the evacuable space to maintain a vacuum in the space after it is evacuated.

8. The container of claim 3 wherein the outer shell is corrugated.

9. An insulated container comprising in combination an outer shell, a liquefied gas storage compartment and a separate perishable food storage compartment spaced from the liquefied gas storage compartment, said compartments being both situated within the outer shell so as to define an intervening continuous evacuable space between the compartments and the outer shell, means in the evacuable space for supporting the atmospheric load on the outer shell when the evacuable space is evacuated, composite insulating material composed of radiant heat reflecting components and low heat conducting components disposed in the evacuable space so as to minimize heat leak into the compartments and from the perishable food storage compartment to the liquefied gas storage compartment, gas-impermeable, low heat conducting organic elastomeric conduit gas-tightly attached at one end to the perishable food storage compartment and at the other end to the outer shell for introducing perishable food into the food storage compartment, a low heat conducting sealing means to minimize heat leak into the container through the conduit, a transfer conduit for transferring liquefied gas from the liquefied gas storage compartment to the perishable food storage compartment extending into the compartment, perforations in the portion of the transfer conduit within the perishable food storage compartment and a control means for regulating the transfer of liquefied gas into the perishable food storage compartment through the transfer conduit in response to the refrigeration requirements of the latter compartment.

10. The insulated container of claim 9 wherein the low heat conducting elastomeric conduit is composed of butyl rubber.

11. A panel for use in producing thermally insulated containers comprising (1) an an outer panel wall, (2) an inner panel wall spaced from the outer panel wall so as to define an intervening insulating space, and (3) a strip of a gas-impermeable elastomeric material of low thermal conductivity that is gas-tightly attached to an edge of the outer panel wall and to an edge of the inner panel wall, said strip being capable of deforming without failure so as to allow for movement of the walls relative to each other due to thermal expansion and contraction and that is capable of maintaining a vacuum in an evacuated space formed at least in part from the insulating space.

12. A panel for use in producing thermally insulated containers comprising (1) a corrugated outer panel wall, (2) a flat inner panel wall spaced from the outer panel wall so as to define an intervening insulating space, (3) a strip of a gas-impermeable elastomeric material of low thermal conductivity that is attached to an edge of the outer panel wall and to an edge of the inner panel wall, said strip being capable of deforming without failure so as to allow for movement of the walls relative to each other due to thermal expansion and contraction, and also capable of maintaining a vacuum in an evacuated space formed at least in part from the insulating space; (4) a plurality of load supporting pegs arranged in the insulating space having their longitudinal axes perpendicular to the inner panel wall and having their ends abutting the panel walls, said pegs consisting essentially of fibrous glass material wherein the longitudinal axes of the fibers are perpendicular to the longitudinal axes of the pegs and; (5) a gas adsorbent in the insulating space.

References Cited by the Examiner

UNITED STATES PATENTS

| 2,900,800 | 8/1959 | Loveday | 62—45 |
| 2,952,987 | 9/1960 | Clauson | 62—45 |
| 3,059,114 | 10/1962 | Haettinger et al. | 62—45 X |
| 3,092,933 | 6/1963 | Closner et al. | 62—45 X |
| 3,092,974 | 6/1963 | Haumann et al. | 62—373 X |
| 3,110,156 | 11/1963 | Niemann | 62—45 |
| 3,114,469 | 12/1963 | Francis et al. | 62—45 X |
| 3,130,561 | 4/1964 | Hnilicka | 62—45 X |
| 3,158,459 | 11/1964 | Guilhem | 62—45 |

FOREIGN PATENTS 1,237,018  6/1960  France.

ROBERT A. O'LEARY, Primary Examiner.

LLOYD L. KING, Examiner.